(12) United States Patent
McDonnell et al.

(10) Patent No.: US 8,071,675 B2
(45) Date of Patent: Dec. 6, 2011

(54) CYANOACRYLATE COMPOSITE FORMING SYSTEM

(75) Inventors: Patrick F. McDonnell, Terenure (IE); Brendan J. Kneafsey, Lucan (IE); Robert J. Lambert, Lucan (IE)

(73) Assignee: Loctite (R&D) Limited, Dublin (IE)

( * ) Notice: Subject to any disclaimer, the term of this patent is extended or adjusted under 35 U.S.C. 154(b) by 1453 days.

(21) Appl. No.: 11/305,147

(22) Filed: Dec. 19, 2005

(65) Prior Publication Data

US 2007/0137784 A1    Jun. 21, 2007

(51) Int. Cl.
*C08L 31/00*    (2006.01)
*B29C 47/00*    (2006.01)
*B29C 65/00*    (2006.01)
*C08F 12/28*    (2006.01)
*C08F 118/02*   (2006.01)

(52) U.S. Cl. ......... 524/556; 524/13; 156/293; 526/310; 526/319

(58) Field of Classification Search .............. 524/13, 524/556; 156/293; 526/310, 319
See application file for complete search history.

(56) References Cited

U.S. PATENT DOCUMENTS

| | | | |
|---|---|---|---|
| 2,794,788 A | 6/1957 | Coover, Jr. et al. | |
| 3,223,083 A | 12/1965 | Cobey | |
| 3,254,111 A | 5/1966 | Hawkins et al. | |
| 3,607,542 A | 9/1971 | Leonard et al. | |
| 3,654,340 A | 4/1972 | Banitt | |
| 3,663,501 A * | 5/1972 | Adams et al. ................ | 523/203 |
| 3,692,752 A | 9/1972 | Setsuda et al. | |
| 3,836,377 A | 9/1974 | Delahunty | |
| 4,102,945 A | 7/1978 | Gleave | |
| 4,105,715 A | 8/1978 | Gleave | |
| 4,440,910 A | 4/1984 | O'Connor | |
| 4,444,933 A | 4/1984 | Columbus et al. | |
| 4,477,607 A | 10/1984 | Litke | |
| 4,533,422 A | 8/1985 | Litke | |
| 4,556,700 A | 12/1985 | Harris et al. | |
| 4,560,723 A | 12/1985 | Millet et al. | |
| 4,582,648 A * | 4/1986 | Hirakawa ..................... | 558/442 |
| 4,622,414 A | 11/1986 | McKervey | |
| 4,636,539 A | 1/1987 | Harris et al. | |
| 4,672,084 A | 6/1987 | Dierdorf et al. | |
| 4,695,615 A | 9/1987 | Leonard et al. | |
| 4,713,405 A | 12/1987 | Koga et al. | |
| 4,718,966 A | 1/1988 | Harris et al. | |
| 4,837,260 A | 6/1989 | Sato et al. | |
| 4,855,461 A | 8/1989 | Harris | |
| 4,906,317 A | 3/1990 | Liu | |
| 4,906,318 A | 3/1990 | Miyazaki | |
| 5,246,973 A | 9/1993 | Nakamura et al. | |
| 5,312,864 A | 5/1994 | Wenz et al. | |
| 5,340,873 A | 8/1994 | Mitry | |
| 5,739,205 A | 4/1998 | Nishino | |
| 5,994,464 A | 11/1999 | Ohsawa et al. | |
| 6,475,331 B1 | 11/2002 | O'Connor | |
| 6,607,632 B1 | 8/2003 | McDonnell et al. | |
| 6,617,385 B1 | 9/2003 | Klauck et al. | |
| 6,977,278 B1 | 12/2005 | Misiak | |

FOREIGN PATENT DOCUMENTS

CA    715 140    8/1965

(Continued)

OTHER PUBLICATIONS

Abstract for JP 56-127609 (1981).

(Continued)

*Primary Examiner* — William Cheung
(74) *Attorney, Agent, or Firm* — Steven C. Bauman (57) ABSTRACT

This invention relates to a system for forming a composite from a cyanoacrylate composition and a filler within depressions, holes, cracks or spaces in a substrate. The system also allows for the placement of a cantilevered member in the filled depression, hole, crack or space in the substrate to support a load when the cyanoacrylate has cured.

36 Claims, 1 Drawing Sheet

FOREIGN PATENT DOCUMENTS

| | | |
|---|---|---|
| DE | 34 00 577 C2 | 8/1994 |
| DE | 695 03 844 T2 | 8/1998 |
| EP | 197 481 B1 | 10/1986 |
| EP | 0 686 681 B1 | 8/1998 |
| FR | 2 358 454 A1 | 7/1977 |
| GB | 1529105 | 10/1978 |
| JP | 55-129473 A | 10/1980 |
| JP | 56-127609 A | 10/1981 |
| WO | WO 83/02450 A1 | 7/1983 |
| WO | WO 99/28399 A1 | 6/1999 |

OTHER PUBLICATIONS

Abstract for JP 55-129473 (1980).

H. V. Coover et al., "Cyanoacrylate Adhesives", *Handbook of Adhesives*, 27, pp. 463-477, Skeist, ed, Van Nostrand Reinhold, New York, 3$^{rd}$ Edition (1990).

G.H. Millet, "Cyanoacrylate Adhesives" in *Structural Adhesvies:Chemistry and Technology*, S.R. Hartshorn, ed., Plenun Press, New York, pp. 249-307 (1986).

C. Donker, "The Chemistry of Tackifying Resins—Parts I, II and III", Adhesives & Sealants (2002 and 2003) (www.specialchem4adhesives.com).

"Molecular Weight and Solution Viscosity Characterization of PVC", D. E. Skillicorn, Journal of Vinyl Technology, Jun. 1993, vol. 15, No. 2, pp. 105-108.

"UCAR™ VMCC", Dow Product Information, Form No. 322-00119-0306X-Am, pp. 1-3, Mar. 2006.

"UCAR™ VMCC", Dow Product Information, Form No. 322-00120-0306X-AM, pp. 1-3, Mar. 2006.

"Determination of the Viscosity of Polymers in Dilute Solution using Capillary Viscometers", Part 2: Poly(vinyl chloride) resins, Reference No. ISO 1628-2:1998(E), pp. 1-14.

"Reference: Polymer Properties and Reference: Glossary", Aldrich Polymer Products Application And Reference Information, pp. 42-45 and 50-51, (2007) at www.sigmaaldrich.com/aldrich/brochure/al_pp_applications.pdf.

\* cited by examiner

FIG. 3

CYANOACRYLATE COMPOSITE FORMING SYSTEM

BACKGROUND OF THE INVENTION

1. Field of the Invention

This invention relates to a system for forming a composite from a cyanoacrylate composition and a filler within depressions, holes, cracks or spaces in a substrate. The system also allows for the placement of a cantilevered member in the filled depression, hole, crack or space in the substrate to support a load when the cyanoacrylate has cured.

2. Brief Description of Related Technology

Cyanoacrylate compositions are well known, and widely used as quick setting, instant adhesives with a wide variety of uses. See H. V. Coover, D. W. Dreifus and J. T. O'Connor, "Cyanoacrylate Adhesives" in *Handbook of Adhesives*, 27, 463-77, I. Skeist, ed., Van Nostrand Reinhold, New York, 3rd ed. (1990). See also G. H. Millet "Cyanoacrylate Adhesives" in *Structural Adhesives: Chemistry and Technology*, S. R. Hartshorn, ed., Plenun Press, New York, p. 249-307 (1986).

A variety of fillers have been incorporated directly into cyanoacrylate compositions to bring about certain changes in physical properties in one part compositions. For instance, U.S. Pat. No. 2,794,788 teaches thickening of cyanoacrylate adhesives by dissolving therein quantities of polymeric alkyl cyanoacrylates, as well as other compounds including polyacrylates and methacrylates, and cellulose esters such as acetate, propionate and butyrate. U.S. Pat. No. 3,836,377 notes among the additional known thickeners polyvinyl ethers such as polyvinylmethyl ether. U.S. Pat. No. 3,692,752 discloses thickened cyanoacrylates containing certain polyether acrylates/methacrylates, acrylic/methacrylic esters of bis(hydroxyalkyl)phosphonic acid derivatives, and acrylic/methacrylic esters of tris(hydroxyalkyl)cyanuric acid derivatives. The '788, '377 and '752 patents each relate to one part thickened cyanoacrylate compositions containing organic compounds as thickeners.

Various inorganic materials have also been proposed as fillers, which can thicken the composition. In that regard U.S. Pat. No. 3,663,501 teaches preparation of a dental cement containing inert, finely-divided solids such as fused silica, quartz and alumina. Similarly, U.S. Pat. No. 3,607,542 teaches the preparation of a water-resistant cyanoacrylate paste containing insoluble, inert fillers such as salts of calcium, titanium, zinc, tin, aluminum, iron and copper, among others.

U.S. Pat. No. 4,102,945 (Gleave) is directed to and claims a thickened, curable adhesive composition comprising a monomeric ester of 2-cyanoacrylic acid, and for each 100 parts by weight of monomeric ester, about 3 to about 30 parts by weight of an organic material which is an acrylonitrile-butadiene-styrene terpolymer, where the composition has improved peel strength over the corresponding unthickened adhesive.

U.S. Pat. No. 4,105,715 (Gleave) is directed to and claims a thixotropic, curable adhesive composition comprising a monomeric ester of 2-cyanoacrylic acid, and for each 100 parts by weight of monomeric ester, about 5 to about 100 parts by weight of a polyvinylidene fluoride powder. It is also disclosed therein that polycarbonates, polyethylenes, and acrylic block copolymer resins containing saturated elastomer segments may be used. The particle size of the filler is about 2 to 200 microns. These finely-divided organic powders which are not dissolved or not fully dissolved in the cyanoacrylate monomer convert the liquid cyanoacrylate to a non-drip, thixotropic gel or paste.

Despite the state-of-the-art it is not believed that cyanoacrylates have been used as part of a two part system to form together with a filler a composite within a depression, hole, crack or space in a substrate or between two substrates, let alone to anchor placement of a cantilevered member which is capable of supporting a load.

However, other adhesive systems are known for such applications in general. For instance, CHEMOFAST ramcord Befestigungssyteme GmbH has promoted for sale three different "chemical anchoring" systems for heavy load carrying attachments in concrete, solid stone or hollow brick surfaces. These systems are based on one of "reaction resin mortar, epoxy-acrylate-based in cartridges", "reaction resin mortar, polyester-based" or "reaction resin mortar, vinyl-ester-based styrol-free".

In each of these systems, their usage is described in terms of drilling a hole in the substrate, cleaning out the drilled hole, and either filling the cleaned drill hole with the reaction resin mortar and then placing a reinforcement bar or threaded rod into the reaction resin mortar filled drill hole or placing a sleeve collar into the cleaned drill hole and filling the collar with the reaction resin mortar and then placing an anchoring element into the reaction resin mortar filled collar within the drill hole, and thereafter curing the reaction resin mortar, say for forty five minutes at room temperature (though other conditions of temperature and time combinations are also disclosed). Once cured, a component may be installed onto the reinforcement bar, threaded rod or anchoring element and torque applied thereto.

While these CHEMOFAST systems have been met with commercial acceptance, it would be desirable to create adhesive systems for such applications that are faster curing at room temperature and that do not require a step of cleaning out the hole, whether the hole was made for the purpose of "chemical anchoring" or whether the hole previously existed and is to be used to "chemically anchor" another article or is simply to be filled. In addition, it would be desirable to create such an adhesive system where the adhesive is dispensed after the filler material, so that there is less opportunity for excess adhesive to be used, thus rendering clean up simpler.

In addition, a system has been offered for sale in Japan, which is seemingly similar to the CHEMOFAST systems, but is based on polyurethane chemistry and includes in the package a series of sponges for placement within the holed prior to dispensing of the polyurethane.

Thus, notwithstanding the state-of-the-technology it would be desirable to provide a composite forming system in which a cyanoacrylate may be applied to a depression, hole or crack in a substrate, into at least a portion of which has been placed a filler, and a composite may be formed within the depression, hole or crack within a period of time of less than about five minutes at room temperature, and when formed such composite is capable of anchoring a cantilevered member which is capable of supporting a load.

SUMMARY OF THE INVENTION

According to the invention, there is provided in one aspect a curable system for filling a depression, hole, crack or space in a substrate or a space between an assembly of two or more substrates. The curable system includes the combination in a first part a cyanoacrylate composition and in a second part a filler material.

In one way, the second part may be applied or introduced first to the depression, hole, crack or space in the substrate so as to fill at least a portion of that depression, hole, crack or space with the filler material. Thereafter, the first part may be applied or introduced to the depression, hole, crack or space in the substrate filled at least partially with the filler material to fill at least a portion of that depression, hole, crack or space with the cyanoacrylate composition.

In another way, the first part of the second part may be mixed together to form a part, which may then be applied or introduced to the depression, hole, crack or space in the substrate.

The cyanoacrylate should be allowed to cure at room temperature for a period of time of five minutes or less to form a substrate or assembly of two or more substrates that contains a filled cured cyanoacrylate occupying the at least a portion of the depression, hole, crack or space. Of course, depending upon the dimensions (e.g., width, depth, etc.) of the depression, hole, crack or space, the type of cyanoacrylate chosen and the type of filler chosen, the time required to cure the composition to form the composite may vary.

In a second aspect of the invention, there is provided a combination of a cyanoacrylate composition and a filler material, each of which is to be applied to a depression, hole, crack or space in an article in a stepwise fashion so that the filler is initially occupied at least a portion of that depression, hole, crack or space and the cyanoacrylate composition is applied thereover and allowed to cure thereafter. An article is thus created with a depression, hole, crack or space filled with a cured cyanoacrylate composition.

In a third aspect of the invention, there is provided a room temperature curing composite forming system. The system includes two parts. Part A includes a one part adhesive of a cyanoacrylate component; and Part B includes a filler material.

In a fourth aspect of the invention, there is provided a kit for filling a depression, hole, crack or space in a substrate or a space between an assembly of two or more substrates. The kit includes two parts. Part A includes a one part adhesive comprising a cyanoacrylate component; and Part B includes a filler material.

In a fifth aspect of the invention, there is provided a method of using a cyanoacrylate composition to fill a depression, hole, crack or space in a substrate. The method includes the steps of providing an article having a depression, hole, crack or space; providing a filler material; providing a cyanoacrylate composition; introducing the filler material into at least a portion of the depression, hole, crack or space of the article and thereafter applying the cyanoacrylate composition thereto; and allowing the cyanoacrylate composition to cure, thereby forming an article having a depression, hole, crack or space filled at least partially with a cured cyanoacrylate composition.

In a sixth aspect of the invention, there is provided a method of using a two part cyanoacrylate bonding system to bond together two or more substrates. The method includes the steps of providing a first substrate to be bonded; providing a second substrate to be bonded in at least a partially spaced apart relationship with said first substrate; providing a filler material; providing a cyanoacrylate composition; introducing the filler into the at least partially spaced apart first and second substrates and thereafter applying the cyanoacrylate composition into at least a portion of the space between the first and second substrates; and allowing the cyanoacrylate composition to cure, thereby forming an article having at least a partially filled, cured cyanoacrylate composition between the first and the second substrates.

The composition once placed within the depression, hole, crack or space of the substrate to be filled is capable to take the shape thereof and cure into that shape. Once the composition (the cyanoacrylate/filler combination) cures into that shape, it is sandable so that a smooth surface may be created. In addition, the composition is coatable such that a paint, stain or coating may be applied (the degree to which the coating adheres to the article will depend in part on the article itself but also the nature of the filler chosen).

DETAILED DESCRIPTION OF THE INVENTION

The cyanoacrylate component includes cyanoacrylate monomers which may be represented by $H_2C=C(CN)-COOR$, where R is selected from $C_{1-15}$ alkyl, alkoxyalkyl, cycloalkyl, alkenyl, aralkyl, aryl, allyl and haloalkyl groups. Desirably, the cyanoacrylate monomer is selected from methyl cyanoacrylate, ethyl-2-cyanoacrylate, propyl cyanoacrylates, butyl cyanoacrylates (such as n-butyl-2-cyanoacrylate), octyl cyanoacrylates, allyl cyanoacrylate, β-methoxyethyl cyanoacrylate and combinations thereof. A particularly desirable one is ethyl-2-cyanoacrylate.

Additives may be included in the inventive compositions to confer additional physical properties, such as improved shelf-life stability, thixotropy, increased viscosity, color, improved toughness, flexibility and enhanced resistance to thermal degradation. Such additives therefore may be selected from free radical stabilizers, anionic stabilizers, gelling agents, thickeners, dyes, toughening agents, thermal resistance enhancers, and combinations thereof.

Anionic stabilizers are ordinarily an acidic substance, soluble in the ester of 2-cyanoacrylic acids, which inhibits anionic polymerization, and are conventionally present in cyanoacrylate compositions. The specific stabilizer chosen is not critical to this invention, and a number of suitable inhibitors of anionic polymerization are well known in the art, such as soluble acidic gases such as sulfur dioxide, sulfur trioxide, nitric oxide, and hydrogen fluoride.

Free radical stabilizers that inhibit polymerization, such as quinone, hydroquinone, t-butyl catechol, p-methoxyphenol, and the like are also conventionally present in cyanoacrylate compositions. The above inhibitors may be used within wide ranges, which are known in the art and for the sake of brevity not repeated here. In the case where the composition is destined for outside use, it may be desirable to increase the level of free radical stabilizer in the cyanoacrylate in order to inhibit environmental degradation.

Plasticizers when used in cyanoacrylate compositions serve to make the cured products less brittle and, therefore, more durable. In the context of the present invention, the plasticizers can also be used to confer tack onto the filler materials (see below for additional discussion). Common plasticizers used in cyanoacrylates are $C_{1-10}$ alkyl esters of dibasic acids such as sebasic acid and malonic acid. Other plasticizers, such as diaryl ethers and polyurethanes, also may be used, and a variety of other plasticizers are also known. For instance, in the context of providing enhanced and robust adhesion to glass substrates, U.S. Pat. No. 6,607,632 (McDonnell) speaks to and claims a composition that includes beyond the a cyanoacrylate monomer, at least one plasticizer in the amount of 28 to 60% w/w by weight of the composition and at least one silane in the amount of 0.1 to % to 5.0% w/w by weight of the composition. With this combination, such enhanced and robust adhesion to glass substrates was obtained. Representative plasticizers include conventional materials such as is disclosed in Great Britain Patent Application No. GB 1 529 105, for instance alkyl phthalates, azelates, adipates, sebacates, citrates, phosphates, succinates, benzoates and trimellitates. Desirable plasticizers are dibutyl phthalate, benzylbutyl phthalate, diheptyl phthalate, dibutyl sebacate and diethyleneglycol dibenzoate. Blends of two or more different plasticizers are also beneficial.

In addition, U.S. patent application Ser. No. 10/023,950, the disclosure of which is hereby incorporated herein by reference, describes and claims cyanoacrylate compositions that possess enhanced flexibility that use in addition to a combination of different cyanoacrylates an ester group containing plasticizer, which is miscible in the cyanoacrylate combination, is present in the composition in an amount between about 15 to about 40% by weight of the composition, and has an Ap/Po ratio in the range of about 1.25 to less than about 6 and/or the plasticizer component comprising trimethyl trimellithate or an Ap/Po ratio in the range of about 1 to less than about 6, provided the plasticizer component does not include pentaerythritoltetrabenzoate as the sole plasticizer. Referring back to the '632 patent, the term "silane" as used herein includes silane hydrides and substituted silanes. The silane may contain a cyclic structure. If the Si atom forms part of a cycle it should not form part of a silacrown cycle (crown structure). If the Si atom forms part of a cycle, the cycle desirably should comprise no more than three oxygen atoms. The cyclic group may be unsubstituted or substituted with halogen or may be bridged or interrupted by one or more oxo groups and suitably four to eight atoms form the cycle. Examples of cyclic silanes of this general formula include: cyclohexyldimethylchlorosilane, cyclohexyldimethylsilane, cyclohexylmethyl)trichlorosilanes, cyclohexyltrichlorosilane, (3-cyclopentadienylpropyl)-triethoxysilane, cyclopentamethylenedichlorosilane, cyclopentamethylenedimethylsilane, cyclotetramethylenedichlorosilane, cyclotetramethylenedimethylsilane, cyclotrimethylethylenedichlorosilane, cyclotrimethylenedimethylsilane, dihexyldichlorosilane, diisopropenoxydimethylsilane, diisopropylchlorosilane, dimesityldichlorosilane, 1,1-dimethyl-1-sila-2-oxacyclohexane, Si-methyl(4-chloro-3,5 dimethyl) benzooxasilepin methyl ester, and benzooxasilepin dimethylester.

The silane constituent can suitably be one or more of a range of alkoxy silanes such as vinyltriethoxy silane, vinyltrimethoxy silane, glycidoxypropyltrimethoxy silane, ethyltriethoxy silane, dimethyldiacetoxy silane, propyltriacetoxy silane and vinylmethyldiacetoxy silane. Silanes giving a particularly good balance of compatibility and performance include methyltriacetoxy silane, 3-(methacryloxy)propyltrimethoxy silane and vinyltriacetoxy silane.

As regards tougheners, U.S. Pat. No. 4,440,910 (O'Connor) speaks to cyanoacrylate compositions toughened through the use of elastomeric fillers, such as about 0.5% to about 20% by weight of an elastomeric copolymer of a lower alkene monomer and (i) acrylic acid esters (ii) methacrylic acid esters or (iii) vinyl acetate.

The filler material may be selected from a variety of materials including paper, cardboard, fiber, gauze, cotton, wood, glass (beads, crushed glass, fragments and the like), rubbers, sponge, metals, natural materials (such as crushed sea shells, hemp, nut shells and the like), inorganic fillers and synthetics. The chosen filler should be readily wettable by the cyanoacrylate to ensure that the cyanoacrylate has migrated throughout the filler that occupies the depression, hole, crack or space.

The filler once placed within the depression, hole, crack or space should have some porosity to permit the cyanoacrylate to penetrate the depth of the depression, hole, crack or space into which the filler and cyanoacrylate have been disposed.

In order for the filler material to remain in place within the depression, hole, crack or space, it is desirable for the filler material to have some tack. Tack may be inherent to the material used or may be created by combining the filler initially with an additional material, such as any liquid whose rheology is greater than that of the cyanoacrylate and/or is capable of at least partially wetting the filler material so that the surfaces of the filler material become sticky and thus capable of forming a paste. In the context of the present invention, "tack" may be viewed as the ability to maintain the filler in place so that the filler does not become dislodged from the depression, hole, crack or space. For instance, tackifying resins can be mixed with the fillers to provide the desired tack. Tackifying resins can be divided into three groups: hydrocarbon resins, rosin resins and terpene resins. Hydrocarbon resins are based on a petroleum feedstock, i.e., a synthetic source, rosin resins are based on a natural feedstock: gained from pine trees and terpene resins are generated from a natural source, wood turpentine or from the kraft sulphate pulping process. See C. Donker, "The Chemistry of Tackifying Resins—Parts I, II and III", Adhesives & Sealants (2002 and 2003); www.specialchem4adhesives.com.

In that regard, the cyanoacrylate may be mixed initially with the filler material, with or without a tackifying resin to form a paste which may then be disposed within the depression, hole, crack or space. Alternatively, the filler, again with or without the tackifying resin, may be disposed within the depression, hole, crack or space and thereafter the cyanoacrylate dispensed thereover.

Synthetics or plastics may be selected from a host of materials such as polyhydrocarbons, including polyacrylates and polymethacrylates, polyurethanes, polyesters, polyethers, polyphenolics, polystryrenes, and polyolefins. Representative though not limiting examples of such materials include cellulose esters such as acetate, propionate and butyrate, polyethers, such as polyvinyl ethers such as polyvinylmethyl ether, polyether acrylates/methacrylates, acrylic/methacrylic esters of bis(hydroxyalkyl)phosphonic acid derivatives, acrylic/methacrylic esters of tris(hydroxyalkyl)cyanuric acid derivatives, acrylonitrile-butadiene-styrene terpolymer, polyvinylidene fluoride, polycarbonates, polyethylenes, and acrylic block copolymer resins containing saturated elastomer segments.

Suitable metals (and salts and/or oxides thereof) include for instance titanium, zinc, tin, aluminum, iron and copper.

Fillers such as inorganic ones like silica, quartz, and calcium may be used.

And in the construction setting, fillers such as foams, rubbers, stones, sand, paper, cardboard and clays may be used.

In addition, expandable microspheres may also be used to fill the depression, hole, crack or space. These microspheres generally may be constructed from a material that can soften at the temperature experienced during the exotherm produced for cyanoacrylate polymerization. As the material softened, the gas (whether it is simply air or a gas, such as a hydrocarbon or noble gas) contained within the microsphere would be released during polymerization creating an expandable or foaming composition. A commercially available example of such a microsphere is available from Akzo Nobel, Netherlands under the tradename EXPANCEL. EXPANCEL-brand microspheres are small spherical plastic particles. The microspheres consist of a polymer shell encapsulating a gas. When the gas inside the shell is heated, it increases its pressure and the thermoplastic shell softens, resulting in a dramatic increase in the volume of the microspheres. When fully expanded, the volume of the microspheres increases more than 40 times.

Alternatively, the micropsheres may be constructed from a more brittle material, which may crack or fracture as pressure therewithin increased as the gas expanded at the temperature experienced during the exotherm produced for cyanoacrylate polymerization. This too would create an expandable or foaming composition. In the context of silicone compositions, see U.S. Pat. No. 5,246,973 (Nakamura), where a foamable silicone is disclosed using thermally expansible hollow plastic particles. See also Canadian Patent No. 715,140, in the context of closed cell sponge rubber production.

The size and shape of the filler is of no importance, except to say that the filler should fit within the depression, hole, crack or space that it is intended to fill at least in part. Of course, combinations of these fillers may be used and different sizes and shapes may also be used, particularly if some aesthetic importance is to be gleaned from the inventive system.

Accelerators and inhibitors (such as those materials referred to above as anionic stabilizers) of cure for cyanoacrylate compositions are well known. Conventionally, if one wanted to accelerate or inhibit the rate of cure of a cyanoacrylate composition, one may choose to add an accelerator and/or inhibitor directly to the composition. That may be done here as well. In addition, or alternatively, one may choose to add an accelerator or inhibitor of cyanoacrylate cure to a tackifying resin, if used. The filler chosen for use may be pretreated, or for that matter the substrate to which the system is to be applied, with an activator in order to speed the cure of the cyanoacrylate or an inhibitor to retard the cure.

The accelerators may be selected from a host of different chemical families, such as are noted below.

Useful accelerators may be selected from calixarenes and oxacalixarenes, silacrowns, crown ethers, cyclodextrins, poly(ethyleneglycol)di(meth)acrylates, ethoxylated hydric compounds and combinations thereof.

Of the calixarenes and oxacalixarenes, many are known, and are reported in the patent literature. See e.g., U.S. Pat. Nos. 4,556,700, 4,622,414, 4,636,539, 4,695,615, 4,718,966, and 4,855,461, the disclosures of each of which are hereby expressly incorporated herein by reference.

For instance, as regards calixarenes, those within structure I below are useful herein:

where $R^1$ is alkyl, alkoxy, substituted alkyl or substituted alkoxy; $R^2$ is H or alkyl; and n is 4, 6 or 8.

One particularly desirable calixarene is tetrabutyl tetra[2-ethoxy-2-oxoethoxy]calix-4-arene.

A host of crown ethers are known. For instance, examples which may be used herein either individually or in combination, or in combination with other first accelerators include 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methyl-benzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-5-oxygen-20-crown-7. See U.S. Pat. No. 4,837,260 (Sato), the disclosure of which is hereby expressly incorporated here by reference.

Of the silacrowns, again many are known, and are reported in the literature. For instance, a typical silacrown may be represented within structure II below:

where $R^3$ and $R^4$ are organo groups which do not themselves cause polymerization of the cyanoacrylate monomer, $R^5$ is H or $CH_3$ and n is an integer of between 1 and 4. Examples of suitable $R^3$ and $R^4$ groups are R groups, alkoxy groups, such as methoxy, and aryloxy groups, such as phenoxy. The $R^3$ and $R^4$ groups may contain halogen or other substituents, an example being trifluoropropyl. However, groups not suitable as $R^4$ and $R^5$ groups are basic groups, such as amino, substituted amino and alkylamino.

Specific examples of silacrown compounds herein include:

dimethylsila-11-crown-4 (III);

dimethylsila-14-crown-5 (IV);

and dimethylsila-17-crown-6 (V). See e.g. U.S. Pat. No. 4,906,317 (Liu), the disclosure of which is hereby expressly incorporated herein by reference.

Many cyclodextrins may be used in connection with the present invention. For instance, those described and claimed in U.S. Pat. No. 5,312,864 (Wenz), the disclosure of which is hereby expressly incorporated herein by reference, as hydroxyl group derivatives of an α, β or γ-cyclodextrin which is at least partly soluble in the cyanoacrylate would be appropriate choices for use herein as the first accelerator component.

For instance, poly(ethylene glycol)di(meth)acrylates suitable for use herein include those within structure VI below:

where n is greater than 3, such as within the range of 3 to 12, with n being 9 as particularly desirable. More specific examples include PEG 200 DMA, (where n is about 4) PEG 400 DMA (where n is about 9), PEG 600 DMA (where n is about 14), and PEG 800 DMA (where n is about 19), where the number (e.g., 400) represents the average molecular weight of the glycol portion of the molecule, excluding the two methacrylate groups, expressed as grams/mole (i.e., 400 g/mol). A particularly desirable PEG DMA is PEG 400 DMA.

And of the ethoxylated hydric compounds (or ethoxylated fatty alcohols that may be employed), appropriate ones may be chosen from those within structure VII:

where $C_m$ can be a linear or branched alkyl or alkenyl chain, m is an integer between 1 to 30, such as from 5 to 20, n is an integer between 2 to 30, such as from 5 to 15, and R may be H or alkyl, such as $C_{1-6}$ alkyl.

Commercially available examples of materials within structure VII include those offered under the DEHYDOL tradename from Henkel KGaA, Dusseldorf, Germany, such as DEHYDOL 100.

Additional accelerators are embraced by structure VIII where R is hydrogen, alkyl, alkyloxy, alkyl thioethers, haloalkyl, carboxylic acid and esters thereof, sulfinic, sulfonic and sulfurous acids and esters, phosphinic, phosphonic and phosphorous acids and esters thereof, X is optional, but when present is an aliphatic or aromatic hydrocarbyl linkage, which may be substituted by oxygen or sulfur, and Z is a single or double bond, such as where R and X are as defined above, and n is 1-12, m is 1-4, and p is 1-3.

For instance, a particularly desirable chemical class embraced by structure VII is where R, Z and n are as defined above, and R' is the same as R, where g is the same as n, with a particularly desirable chemical within this class being where n and m combined is greater than or equal to 12.

When cured the accelerator should be present, either in the cyanoacrylate composition directly or after coming into contact with the filler and/or the substrate in an amount within the range of from about 0.01% to about 10% by weight, with the range of about 0.1 to about 0.5% by weight being desirable, and about 0.4% by weight of the total composition being particularly desirable. Thus, when the accelerator is desirably mixed into a tackifying resin, it may be at the concentrations given above. Where the accelerator is used as a pretreatment on the filler or the substrate, it may be used in that concentration in a carrier that may evaporate either under atmospheric conditions or under modest temperature conditions.

Similarly, as noted above, it may be desirable in certain applications to retard the rate of cure of the cyanoacrylate. This may be achieved by using an acidic material, whether strong or weak acids, as is well known in the art.

These accelerators or inhibitors allow the end user to adjust the working to suit the particular needs or desires of a certain application.

Once the depression, hole, crack or space is filled at least in part with the combination of cyanoacrylate and filler, a cantilevered member may be placed into the at least partially filled depression, hole, crack or space. The cantilevered member may also be placed into the depression, hole, crack or space after the filler has been introduced but prior to the cyanoacrylate. Alternatively, the filler may be applied to and/or around the cantilevered member, which may be inserted into the depression, hole, crack or space followed by the cyanoacrylate, or which may then be exposed to the cyanoacrylate and the combination of cantilevered member/filler/cyanoacrylate is inserted into the depression, hole, crack or space. Of course, in either of these processes, the cyanoacrylate is allowed to cure.

In either event, the cantilevered member may be placed within an orifice that is pre-made within the filler that is dispersed within the depression, hole, crack or space in the article. Or, the cantilevered member itself may make an orifice within the filler that is dispersed within the depression, hole, crack or space of the article as it is being placed therein. The cyanoacrylate may be applied in and around the filler either before or after the cantilevered member is introduced.

As just noted, the cantilevered member, if introduced to the depression, hole, crack or space after the cyanoacrylate, may be so introduced immediately after some or all of the cyanoacrylate has been applied, or may be introduced after a short period time to allow the cyanoacrylate to begin to cure. The precise timing or order of assembly in this regard is left to the discretion of those of skill in the art.

The cantilevered member is a support mechanism, and may be an item such as a hook, pole or other support mechanism, such as a shelf support. Once secured, the hook mechanism wherein the form of a hook, may be used to support for instance a hanging plant in a brick or stone hole into which the hook has been secured by the inventive cyanoacrylate composite forming system.

Figure 1:
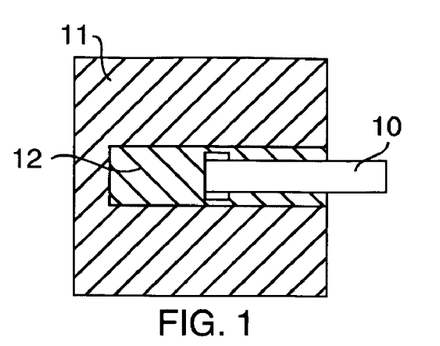
FIG. 1 depicts in cross sectional view of a cantilevered member (here, a headed bolt) inserted into a cyanoacrylate-filled hole.
Figure 2:
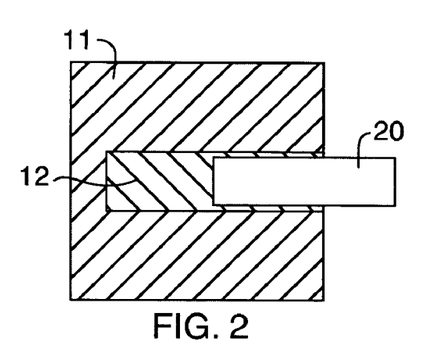
FIG. 2 depicts in cross sectional view of a cantilevered member (here, a threaded bolt) inserted into a cyanoacrylate-filled hole.
Figure 3:
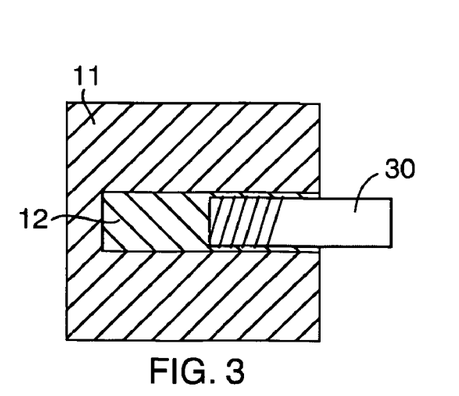
FIG. 3 depicts in cross sectional view of a cantilevered member (here, a rod-like member) inserted into a cyanoacrylate-filled hole.

Reference to FIGS. 1-3 shows the cantilevered member (10, 20 or 30) set within a hole in the substrate 11 and surrounded by the cyanoacrylate filler mixture, where the cyanoacrylate has cured 12.

FIG. 1 shows the cantilevered member as a headed bolt 10; FIG. 2 shows it as a threaded bolt 20; and FIG. 3 shows it as a rod-like member 30.

The viscosity of the cyanoacrylate should be adjusted so that it can effectively wet the filler and penetrate within the interstices created when the filler is introduced and disposed within the depression, hole, crack or space. If the viscosity is too great and the interstices too tight, the cyanoacrylate will have difficulty passing in and about the filler within the depression, hole, crack or space, at least within an appropriate work time prior to cure of the cyanoacrylate.

However, the reactivity of the cyanoacrylate should be adjusted so as to optimize the work time for the end user, so that cure does not occur prior to penetrating substantially fully within and through the interstices of the filler, either outside of or within the depression, hole, crack or space.

One of the benefits and advantages of the present invention is the ability to use the system for a depression, hole, crack or space that is oriented overhead or vertically, without accompanying the typically flow out or dripping that one may find using either a conventional cyanoacrylate without the filler, or using an adhesive or sealant based on another type of technology. This is achieved in part by mixing the filler with a binder that makes a thickened slurry, having tack.

The invention is illustrated further by the following examples.

EXAMPLES

Example 1

A paste of glass beads with a high solid content was prepared by mixing 2 grams of ACRONAL LR8820 (acrylic ester polymer dispersion from BASF Aktiengesellschaft) with 98 grams of glass beads (obtained from Baud Minerals and Polymers, UK & Sweden) with particle size in the range 150-200 microns. The ACRONAL resin acted as an effective binder for the glass particles forming a non-mobile but easily malleable paste with sufficient surface tack to permit the paste to remain where it was placed. The paste was used to fill a 10 mm diameter hole which had been drilled horizontally to a depth of 10 mm in a standard red construction brick. The paste was applied with a spatula to completely fill the hole to the same level as the surrounding brick surface. A low viscosity cyanoacrylate composition was then applied to the centre of the paste-filled hole in an amount sufficient to wet the paste throughout. After a period of time of about 45-60 seconds, the cyanoacrylate composition started to cure to form a solid composite in the hole that quickly developed a hardness similar to or greater than the surrounding brick. In addition the paste was firmly anchored within the hole due to the adhesive properties of the cyanoacrylate liquid. No shrinkage of the cured paste composition occurred due to the high solid content. Any excess of the cured material could be easily levelled by sanding or similar abrasion method. The cyanoacrylate adhesive used in this example was an ethyl cyanoacrylate formulation with a viscosity of 1-3 mPas stabilised with 15-30 ppm of sulphur dioxide or equivalent acidic material and 1000 ppm hydroquinone.

Example 2

The materials and procedures employed in Example 1 were repeated but in this example the hole was drilled in the brick in a vertical orientation. Again the hole was filled with the paste, and due to its rheology and tackiness, the paste remained in place without falling out. The cyanoacrylate composition was applied as in Example 1, to yield a hard and durable composite which successfully completed the task of filling the hole.

Example 3

A paste was prepared as in Example 1, and was used to fill a 10 mm diameter hole which had been drilled to a depth of 15 mm in a teak plank. The paste was applied with a spatula to completely fill the hole to the same level as the surrounding wood surface. A low viscosity (1-3 mPa·s) ethyl cyanoacrylate composition containing 0.4% calixarene as an accelerator was applied dropwise to wet the paste. After about 10 seconds the cyanoacrylate composition cured to a hard mass which had powerful adhesion to the sides and base of the 10 mm diameter hole described above.

Example 4

Example 3 was repeated though in place of teak mahogany wood was used instead. The cyanoacrylate composition was applied as above, and after about 10 seconds a cured mass was observed to have formed which bonded tenaciously to the wood.

Example 5

Example 3 was repeated though in place of teak MDF wood (medium-density fibreboard) was used instead. The cyanoacrylate composition was applied as above, and after about 10 seconds a cured mass was observed to have formed which bonded tenaciously to the wood.

Example 6

Example 3 was repeated though in place of teak plasterboard with a thickness of 10 mm was used instead. The cyanoacrylate composition was applied as above, and after about 10 seconds a cured mass was observed to have formed which bonded tenaciously to the plasterboard as a solid plug.

Example 7

The glass-bead paste described in Example 1 was used to fill a hole drilled in teak wood. The hole had a diameter of 15 mm and a depth of 20 mm. The low viscosity cyanoacrylate composition described in Example 1 was applied dropwise to wet the paste. After about 30 seconds, the cyanoacrylate composition started to cure and increase the structure and viscosity of the paste. At this stage the threaded part of a standard metal cup hook was inserted (using a screwing action) into the midpoint of the paste to a depth of 15 mm. As the paste progressively cured over the next 30 seconds, the cup hook was unscrewed to prevent bonding.

Upon inspection, it was discovered that threads had been created in the solidified paste and the cup hook could be easily reinserted and removed at will. When the cup hook was screwed into the solid paste to a depth of 15 mm, the hook formed a cantilever device capable of supporting a weight of 5 kg for an indefinite period of time.

Example 8

A filler paste was prepared on a percent by weight basis from the following constituents:
  93% glass beads of particle size 250-400 microns
  3.5% EXPANCEL-brand microspheres (Akzo Nobel)
  3.5% ACRONAL LR8820 (BASF Aktiengesellschaft)

A series of 10 mm deep holes were drilled into a flat sheet of obeche timber to a depth of 7 mm. The sheet was then placed in a vertical orientation. The holes were completely packed with the filler paste using a spatula to ensure a level finish with the surrounding wood surface. A low viscosity cyanoacrylate composition as described in Example 1 was carefully injected into the paste with a syringe and needle applicator until the paste was wetted. About 0.5 gram of the cyanoacrylate composition was used to accomplish that. After about 60 seconds, the cyanoacrylate cured to a solid structure that proceeded to expand about 1 mm proud of the surface. The heat generated by the polymerisation of the cyanoacrylate composition was sufficient to activate the expanding properties of the EXPANCEL microspheres, causing the expansion so observed.

Example 9

The 20 mm diameter cavity in a red construction brick was filled to a depth of 20 mm with MATLINE 200 non-woven core fabric material (Nida-Core Corp., Florida, USA), by first rolling the fabric to form a cylinder wad and then pushing the wad firmly and tightly into the brick cavity. Any excess fabric was trimmed so that it was flush with the brick surface.

Sufficient low viscosity ethyl cyanoacrylate adhesive was applied to the centre of the fabric packing to ensure that all the material in the cavity was wetted. Approximately 1 gram of the cyanoacrylate composition was used to accomplish that. After about 60-90 seconds, the cyanoacrylate composition started to cure. The fabric/cyanoacrylate composition combination formed a solid plug for the cavity with excellent adhesion to the internal brick surfaces. As in Example 6 above, a cup hook was screwed into the solid plug-filled cavity before the cyanoacrylate composition had fully cured, to allow the cup hook to be screwed in or out at will. When the hook was fully screwed into the solid plug-filled cavity and cure was allowed to proceed for 2 minutes, the hook was able to support the weight of the brick (2.3 kg) for an indefinite period of time.

Example 10

A filler paste was prepared on a percent by weight basis from the following constituents:
  98% glass beads of particle size 250-400 microns
  2.0% ACRONAL LR8820 (BASF Aktiengesellschaft)

A standard brass bolt, 10 mm×76 mm, was positioned centrally in the cavity of a red construction brick as described in Example 8. The bolt head was located within the cavity and the threaded portion extended perpendicularly about 56 mm from the brick surface. The filler paste was packed firmly around the bolt and flush with the surrounding surface using a spatula. During this procedure, the bolt was held in place by hand. Sufficient low viscosity ethyl cyanoacrylate composition was applied to the filler paste to ensure that all the material in the cavity was wetted. After about 60 seconds, the cyanoacrylate composition cured to a solid mass that firmly anchored the bolt in place. After another 2 minutes, the projecting element of the bolt acted as a cantilever device capable of supporting substantial weights or fixtures. These fixtures could be easily secured in place by use of appropriate nuts, washers, etc.

Example 11

A filler paste was prepared on a percent by weight basis from the following constituents:
97% glass beads of particle size 250-400 microns
3.0% ACRONAL LR8820 (BASF Aktiengesellschaft)

A 25 mm diameter hole was drilled into a 6.5 kg section of a concrete kerbstone to a depth of 25 mm. A brass bolt of the type described in Example 9 was located centrally in the hole and the filler packed around it as described previously. The threaded element of the bolt projected perpendicularly from the concrete surface and was maintained in place by hand. The filler paste was packed firmly around the bolt and flush with the surrounding surface using a spatula. The filler surrounding the bolt was wetted with a low viscosity ethyl cyanoacrylate composition (1-3 mPa·s) containing 0.5% calixarene as an accelerator. After about 45-60 seconds, the cyanoacrylate composition cured to a solid mass that firmly anchored the bolt in place. After about 1-3 minutes, the projecting element of the bolt acted as a cantilever device capable of supporting substantial weights or fixtures. These fixtures could be easily secured in place by use of appropriate nuts, washers, etc.

In this example a metal chain was attached to the cantilever with appropriate nuts and other screw fittings. Within about 3 minutes of curing, a 6.5 kg kerbstone section was lifted and suspended indefinitely by the anchored bolt with the attached chain.

What is claimed is:

1. A curable system for filling a depression, hole, crack or space in a substrate or a space between an assembly of two or more substrates comprising:
   the combination consisting essentially of in a first part a cyanoacrylate composition and in a second part a filler component consisting essentially of a filler material and a tackifying resin,
wherein when
   applied second part first to the depression, hole, crack or space in the substrate so as to fill at least a portion of that depression, hole, crack or space with the filler component and thereafter applied first part second to the depression, hole, crack or space in the substrate filled at least partially with the filler component to fill at least a portion of that depression, hole, crack or space with the cyanoacrylate composition and
   allowed to cure at room temperature for a period of time of up to five minutes at which time cure is substantially complete,
a substrate or assembly of two or more substrates is formed that contains a filled cured cyanoacrylate occupying the at least a portion of the depression, hole, crack or space.

2. A combination consisting essentially of a cyanoacrylate composition and a filler component consisting essentially of a filler material and a tackifying resin, each of which is to be applied to a depression, hole, crack or space in an article in a stepwise fashion so that the filler component initially occupies at least a portion of the depression, hole, crack or space and the cyanoacrylate composition is applied thereover and allowed to cure thereafter, thereby creating an article with a depression filled with a cured cyanoacrylate composition.

3. A room temperature curing composite forming system for use in a depression, hole, crack or space in a substrate or a space between an assembly of two or more substrates, consisting essentially of:
   Part A: a one part adhesive comprising a cyanoacrylate component; and
   Part B: a filler component consisting essentially of a filler material and a tackifying resin.

4. A kit for filling a depression, hole, crack or space in a substrate or a space between an assembly of two or more substrates consisting essentially of:
   Part A: a one part adhesive comprising a cyanoacrylate component; and
   Part B: a filler component consisting essentially of a filler material and a tackifying resin.

5. A method of using a cyanoacrylate composition to fill a depression, hole, crack or space in a substrate or a space between an assembly of two or more substrates in an article, comprising the steps of:
   providing an article having a depression, hole, crack or space;
   providing a filler component consisting essentially of a filler material and a tackifying resin;
   providing a cyanoacrylate composition;
   introducing said filler component into at least a portion of the depression, hole, crack or space of said article in a substrate or a space between an assembly of two or more substrates and thereafter applying said cyanoacrylate composition thereto; and
   allowing the cyanoacrylate composition disposed within the depression, hole, crack or space to cure, thereby forming an article having a depression, hole, crack or space filled at least partially with a cured cyanoacrylate composition.

6. A method of using a two part cyanoacrylate bonding system to bond together two or more substrates, comprising the steps of:
   providing a first substrate to be bonded;
   providing a second substrate to be bonded in at least a partially spaced apart relationship with said first substrate;
   providing a filler component consisting essentially of a filler material and a tackifying resin;
   providing a cyanoacrylate composition;
   introducing said filler component into said at least partially spaced apart first and second substrates and thereafter applying said cyanoacrylate composition into at least a portion of the space between said first and second substrates; and
   allowing the cyanoacrylate composition to cure, thereby forming an article having at least a partially filled, cured cyanoacrylate composition between the first and the second substrates.

7. The system of claim 1, wherein the filler material is a member selected from the group consisting of paper, cardboard, fiber, gauze, cotton, wood, glass, rubbers, foam, stone, sand, clay, sponge, metals, crushed sea shells, hemp, nut shells, inorganic fillers and synthetics.

8. The combination of claim 2, wherein the filler material is a member selected from the group consisting of paper, cardboard, fiber, gauze, cotton, wood, glass, rubbers, foam, stone, sand, clay, sponge, metals, crushed sea shells, hemp, nut shells, inorganic fillers and synthetics.

9. The system of claim 3, wherein the filler material is a member selected from the group consisting of paper, cardboard, fiber, gauze, cotton, wood, glass, rubbers, foam, stone, sand, clay, sponge, metals, sea shells, hemp, nut shells, inorganic fillers and synthetics.

10. The kit of claim 4, wherein the filler material is a member selected from the group consisting of paper, cardboard, fiber, gauze, cotton, wood, glass, rubbers, foam, stone, sand, clay, sponge, metals, crushed sea shells, hemp, nut shells, inorganic fillers and synthetics.

11. The method of claim 5, wherein the filler material is a member selected from the group consisting of paper, cardboard, fiber, gauze, cotton, wood, glass, rubbers, foam, stone, sand, clay, sponge, metals, crushed sea shells, hemp, nut shells, inorganic fillers and synthetics.

12. The method of claim 6, wherein the filler material is a member selected from the group consisting of paper, cardboard, fiber, gauze, cotton, wood, glass, rubbers, foam, stone, sand, clay, sponge, metals, crushed sea shells, hemp, nut shells, inorganic fillers and synthetics.

13. The system of claim 1, wherein when the depression, hole, crack or space is filled at least in part with the combination of cyanoacrylate component and filler component, prior to cure of the cyanoacrylate component a cantilevered member is placed into the at least partially filled depression, hole, crack or space.

14. The system of claim 13, wherein the cantilevered member is a support member capable of supporting a load.

15. The combination of claim 2, wherein when the depression, hole, crack or space is filled at least in part with the combination of cyanoacrylate component and filler component, prior to cure of the cyanoacrylate component a cantilevered member is placed into the at least partially filled depression, hole, crack or space.

16. The combination of claim 15, wherein the cantilevered member is a support member capable of supporting a load.

17. The system of claim 3, wherein when the depression, hole, crack or space is filled at least in part with the combination of cyanoacrylate component and filler component, prior to cure of the cyanoacrylate component a cantilevered member is placed into the at least partially filled depression, hole, crack or space.

18. The system of claim 17, wherein the cantilevered member is a support member capable of supporting a load.

19. The kit of claim 4, wherein when the depression, hole, crack or space is filled at least in part with the combination of cyanoacrylate component and filler component, prior to cure of the cyanoacrylate component a cantilevered member is placed into the at least partially filled depression, hole, crack or space.

20. The kit of claim 19, wherein the cantilevered member is a support member capable of supporting a load.

21. The method of claim 5, wherein when the depression, hole, crack or space is filled at least in part with the combination of cyanoacrylate component and filler component, prior to cure of the cyanoacrylate component a cantilevered member is placed into the at least partially filled depression, hole, crack or space.

22. The method of claim 21, wherein the cantilevered member is a support member capable of supporting a load.

23. The method of claim 6, wherein when the depression, hole, crack or space is filled at least in part with the combination of cyanoacrylate component and filler component, prior to cure of the cyanoacrylate component a cantilevered member is placed into the at least partially filled depression, hole, crack or space.

24. The method of claim 23, wherein the cantilevered member is a support member capable of supporting a load.

25. The curable system of claim 1, wherein the filler component with tack is an expandable microsphere.

26. The combination cyanoacrylate composition and filler of claim 2, wherein the filler component with tack is an expandable microsphere.

27. The curing composite forming system of claim 3, wherein the filler component with tack is an expandable microsphere.

28. The kit of claim 4, wherein the filler component with tack is an expandable microsphere.

29. The method of claim 5, wherein the filler component with tack is an expandable microsphere.

30. The method of claim 6, wherein the filler component with tack is an expandable microsphere.

31. The curable system of claim 1, wherein the tackifying resin has a viscosity greater than the cyanoacrylate component.

32. The combination of claim 2, wherein the tackifying resin has a viscosity greater than the cyanoacrylate component.

33. The curing composite forming system of claim 3, wherein the tackifying resin has a viscosity greater than the cyanoacrylate component.

34. The kit of claim 4, wherein the tackifying resin has a viscosity greater than the cyanoacrylate component.

35. The method of claim 5, wherein the tackifying resin has a viscosity greater than the cyanoacrylate component.

36. The method of claim 6, wherein the tackifying resin has a viscosity greater than the cyanoacrylate component.

\* \* \* \* \*